(12) United States Patent
Helms et al.

(10) Patent No.: US 6,643,466 B1
(45) Date of Patent: Nov. 4, 2003

(54) METHOD AND APPARATUS FOR CONTROLLING SIGNAL POWER LEVEL IN FREE SPACE COMMUNICATION

(75) Inventors: Howard D. Helms, Morris, NJ (US); Dominick J. Imbesi, Somerset, NJ (US); Steven R. Johnson, Monmouth, NJ (US); Gerald Nykolak, Nassau, NY (US); Dennis M. Romain, Morris, NJ (US); Paul F. Szajowski, Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 440 days.

(21) Appl. No.: 09/675,003

(22) Filed: Sep. 29, 2000

(51) Int. Cl.⁷ ............................................... H04B 10/00
(52) U.S. Cl. ....................... 398/120; 398/198; 398/115; 398/38
(58) Field of Search ............... 398/15, 22–23, 398/25, 38, 94, 115, 120, 197

(56) References Cited

U.S. PATENT DOCUMENTS

| | | | | |
|---|---|---|---|---|
| 4,553,268 A | * | 11/1985 | Tilly ........................... | 398/15 |
| 5,229,593 A | | 7/1993 | Cato ........................... | 250/205 |
| 5,623,355 A | * | 4/1997 | Olsen .......................... | 398/162 |
| 5,706,112 A | * | 1/1998 | Morita et al. ................ | 398/162 |
| 5,822,099 A | * | 10/1998 | Takamatsu ................... | 398/162 |
| 6,031,647 A | * | 2/2000 | Roberts ........................ | 398/94 |

\* cited by examiner

*Primary Examiner*—Kinfe-Michael Negash

(57) ABSTRACT

In the method and apparatus for controlling the power level of a laser signal in free space communication, a communication terminal transmits an output laser beam into free space and also receives information, through a channel that is not free space laser based, about the power of the output laser beam measured at a distance and at different times. The terminal determines whether a drop in the power of the output laser beam measured at the distance is due to atmospheric effects based on the received information. The terminal increases the power level of the output laser beam to a desired level if the power drop is determined to be due to atmospheric effects. On the other hand, the terminal lowers the power of the output laser beam to a predetermined level if the power drop is determined to be due to blockage thus avoiding harm to accidental observers that might intrude into the path of the laser beams.

24 Claims, 2 Drawing Sheets

METHOD AND APPARATUS FOR CONTROLLING SIGNAL POWER LEVEL IN FREE SPACE COMMUNICATION

FIELD OF THE INVENTION

The present invention relates to communication systems, and more particularly to free space laser communication systems.

BACKGROUND OF THE INVENTION

Free space, point-to-point communication systems are used extensively in the communications field. A network of point-to-point microwave systems can carry messages across the country as part of the public switched telephone network. Despite strong competition from fiber optic based communications systems, microwave or other free space systems are often justified for shorter routes, when right-of-way for a cable system is not available, or when the high communications capacity of a fiber optic system is not needed.

Laser communication systems in particular have become increasingly popular to provide a free space communications link between two locations. Laser systems do not require extensive frequency coordination as do microwave systems in common frequency bands. Moreover, free space laser communication systems often are less expensive to install than either a conventional copper cable system or a fiber optics based system because physical installation of a cable or a fiber is unnecessary. For example, a laser communication system may have application between two corporate locations in a campus environment. Laser communication terminals may be positioned on building rooftops or adjacent windows and aligned to operate between buildings. Moreover, general progress in society is accompanied by increases in the amount of available information and, consequently, increased need for broader bandwidth communication systems. Accordingly, the demand for free space laser communications links is increasing. Such links can be used for communicating a variety of data forms including voice, video, and text.

Free space laser communication systems are considered stationary laser sources for governmental regulatory purposes. They must, therefore, comply with regulatory limits established to protect accidental observers. Exposure to high power laser beams may harm accidental observers. The harm by lasers used in free space communication can be compounded because (1) exposure to some laser wavelengths does not cause any pain that might otherwise warn one of exposure to the laser, and (2) some laser wavelengths are not visible.

Accordingly, standards have been put in place that establish safe limits for the power that may be transmitted by a stationary laser source, such as a laser communication terminal. These permissible power limits affect the communication system's signal-to-noise ratio, operational bit rate, and/or useful distance coverage. To avoid deleterious effects on data communication while protecting accidental observers, U.S. Pat. No. 5,229,593 to Cato discloses an approach that runs the laser power of a free space laser communication system at regulatory established safe levels when exposure or misalignment is determined, otherwise the approach runs laser power at above the safe levels.

The approach disclosed by Cato uses a laser transmitter, laser receiver, and a controller to control the output laser power. In the disclosed approach, the received laser signal must contain a confirmation signal that a receiver down stream has received the transmitted laser signal if output laser power is to be maintained at above safe levels. The disclosed approach, however, suffers from certain disadvantages including not addressing atmospheric effects that might reduce received laser power as opposed to an accidental observer partially blocking the laser path and causing a reduction in the received laser power. The disclosed approach, moreover, does not address needs, implementations, or applications for one way laser communication since the disclosed approach requires a return laser signal carrying confirmation information.

SUMMARY OF THE INVENTION

The present invention presents an approach for free space laser communication that determines whether a reduction in received laser power is due to blockage or whether the reduction is due to atmospheric effects. The inventive approach allows for one-way and two-way laser communication. The inventive approach also allows for controlling the laser communication without suffering from line of sight or atmospheric effects.

The present invention achieves the above mentioned advantages by using a communication terminal that at least has (1) a laser transmitter that transmits a laser output beam; (2) a receiver that receives (by a communication channel that is not free space laser based) information about the power of the output laser beam measured at another communication terminal; and (3) a controller that controls the power of the output laser beam based on whether a reduction in received laser power is due to atmospheric effects or blockage. The receiver may be implemented as one way communication, or may be implemented as a transceiver allowing two way communication; the receiver/transceiver may communicate using broadcasting, telephone, limited bandwidth fiber communication, or any other non-free space laser communication approaches.

The present invention also achieves the above mentioned advantages by a related approach using a communication terminal that at least has (1) a laser transmitter that transmits a laser output beam; (2) first receiver that receives an input laser beam; (3) a second receiver that receives (by a communication channel that is not free space laser based) information about the power of the output laser beam measured at another communication terminal; and (4) a controller that controls the power of the output laser beam based on whether a reduction in received laser power is due to atmospheric effects or blockage. The second receiver may be implemented as one way communication, or may be implemented as a transceiver allowing two way communication; the receiver/transceiver may communicate using broadcasting, telephone, limited bandwidth fiber communication, or any other non-free space laser communication approaches.

The controller of a communication terminal according to the present invention uses information about the power of the transmitted laser beam that is received at a distant terminal, or information about the power of the laser beam input to the communication terminal, or both, to determine whether reduction in power of the transmitted laser received at some distance is due to atmospheric effects or blockage. The controller determines the nature of a reduction in the power of a laser beam using inherent differences in the amount and speed of a reduction in a laser power due to atmospheric effects and blockage. Generally, atmospheric effects occur at a time scale of the order of 10 milliseconds whereas blockage occurs at a time scale of the order of 100 milliseconds. The controller increases power of the output laser beam to above levels deemed safe to an accidental observer if it determines that a reduction in received laser power is due to atmospheric effects. On the other hand, the controller reduces power of the output laser beam to levels deemed safe to an accidental observer if it determines that the reduction in received laser power is due to blockage.

BRIEF DESCRIPTION OF THE DRAWINGS

Other aspects and advantages of the present invention will become apparent upon reading the detailed description, and upon reference to the drawings in which.

The same numbers will be used to label identical features in different figures.

DETAILED DESCRIPTION

The detailed description will first describe the structure and general operation of the embodiments of the communication terminals according to the present invention. The detailed description will next describe the methods used to determine whether a reduction in received power of a free space laser beam is due to atmospheric effects or blockage.

Structural Description of Embodiments

Figure 1:
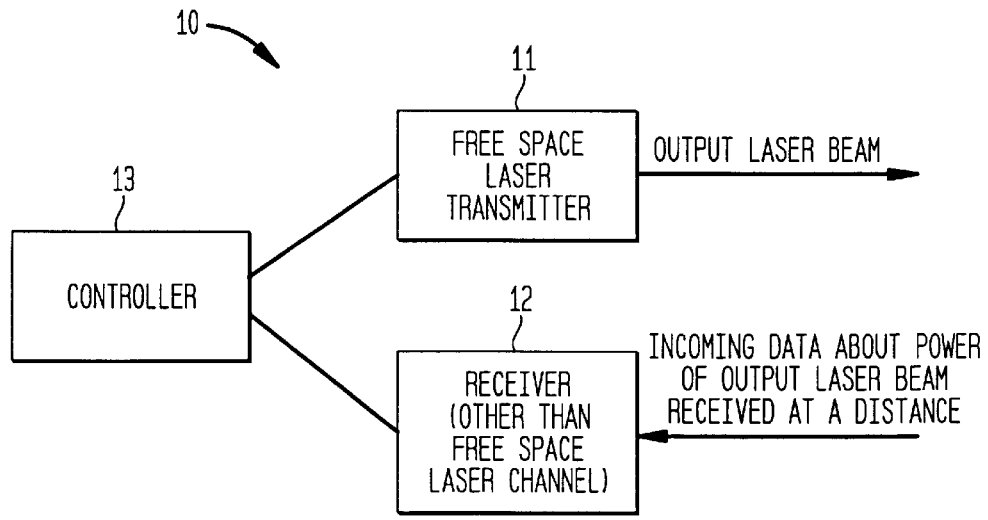
FIG. 1 is a general block diagram illustrating an exemplary embodiment of a communication terminal according to the present invention.

FIG. 1 is a general block diagram illustrating a communication terminal 10 according to a preferred embodiment of the present invention. As shown, the communication terminal 10 includes a transmitter 11, a receiver 12, and a controller wherein the transmitter 11 and the receiver 12 are both operatively connected to the controller 13.

The transmitter 11 is a free space laser transmitter outputting laser beam(s) into free space. In one implementation, the transmitter 11 includes laser(s) that generate the output laser beam(s)—lasers being of any type including, but not limited to, solid state, gaseous, and semiconductor lasers. The laser may be in the form of an oscillator or an oscillator and amplifier(s). In an alternative implementation, the transmitter 11 receives the laser beam(s) to be output by way of a fiber optical coupling allowing the generation of the laser beam(s) at some location other than the transmitter 11 and transferring the laser beam(s) to the transmitter 11. The wavelength of the laser beam(s) may be whatever deemed necessary or appropriate for the specific communication, including but not limited to visible, infrared, and far infrared spectra. In one implementation, the transmitter 11 includes optics used to collimate or direct, or both, the output laser beam(s) onto a targeted receiving terminal—the optics used may be refractive (e.g., lenses) or reflective (e.g., mirrors), or a combination. The transmitter 11 includes elements impressing the communication modulation onto the output laser beam(s) if the transmitter 11 includes the laser oscillator (or the laser oscillator/amplifier(s)).

The receiver 12 receives information about the power of the output laser beam (transmitted by communication terminal 10) detected at a target communication terminal (not shown in FIG. 1) placed at some distance from the terminal 10. The channel through which this information is received at the receiver 12 is not the free space laser communication channel. Rather, in one implementation the communication channel through which the receiver 12 receives the information is a broadcasting channel. Alternative implementations of the non-free-space-laser channel include, but are not limited to, telephone and limited bandwidth fiber communication. The non-free-space-laser channel could be implemented in the radio, microwave, or optical spectra. Such implementations avoid loading up the bandwidth of the free space laser communication; simplify decoding of data; and do not suffer from environmental (e.g., atmospheric) or physical (e.g., blockage) obstacles to delivery of information to the communication terminal 10 that is necessary for the proper operation of the terminal 10. In one implementation, the data packet conveying the information includes a single value representing the power received at a specific interval. In an alternative implementation, the data packet conveying the information includes a string of values representing a series of powers received at specific intervals. The data packet includes information identifying the target communication terminal that generated the information received at the receiver 12 if the terminal 10 is operating in a network environment having a plurality of potential target terminals. The terminal identifying information may be, but not necessarily, dispensed with if the communication system is a link consisting of only two terminals according to implementations of this invention. Furthermore, in one implementation, the receiver 12 processes the information it receives. In an alternative implementation, the receiver 12 transfers the information to the controller 13 for processing by the controller 13.

The controller 13 of FIG. 1 is operatively connected to both the transmitter 11 and the receiver 12. The controller 13 of the terminal 10 is the "brain" containing the decision-making algorithm that processes the information received by the receiver 12. Based on the outcome of the processed information, the controller 13 determines whether a drop in the power received at a target terminal is due to atmospheric effects or due to blockage. The controller 13 makes the determination using information received from the receiver 12. The determination will be discussed in detail below in the section titled "Tests Distinguishing Between Atmospheric Effects and Blockage." In one implementation, the decision-making algorithm of the controller 13 is a software in a processor. Alternatively the decision-making algorithm could be implemented by hardware including digital or analog circuits, digital signal processors, or programmable logic arrays, or combinations thereof including software.

In one implementation, the controller 13 directly influences and controls the transmitter 11 by way of hardware in the controller 13 that increases/decreases output laser beam power. In an alternative implementation, the controller 13 indirectly influences and controls the transmitter 11 by way of outputting a signal to which hardware in the transmitter 11 responds.

If the controller 13 determines that atmospheric effects caused received power disruption, then the controller 13 takes steps (direct/indirect) to increase the output laser beam power to a desired level. The desired output laser power is the power necessary for the proper reception at the receiving communication terminal. The necessary power may very well be unsafe for accidental observers but should not present a risk of harm because the controller 13 has determined that atmospheric effects caused the received power disruption and not something physically blocking the output beam path.

On the other hand, if the controller 13 determines that blockage caused received power disruption, then the controller 13 takes steps (direct/indirect) to decrease within the time intervals set by regulatory limits the power of the output laser beam to a level deemed safe for accidental observers. Assuming that an accidental observer is interfering with the path of output laser beams when the controller 13 determines that blockage is the cause of reduction in received power is an assumption rendering the free space laser communication approach of this invention safe for use under governmental regulations. The average power deemed safe for exposure generally depends on the wavelength of the laser and may be changed based on changing regulatory concerns.

The preferred embodiment described above with respect to FIG. 1 allows for the one-way communication between the communication terminal 10 and other communication terminals—the terminal 10 transmitting data through free space laser communication and the other terminals receiving the transmitted data.

Figure 2:
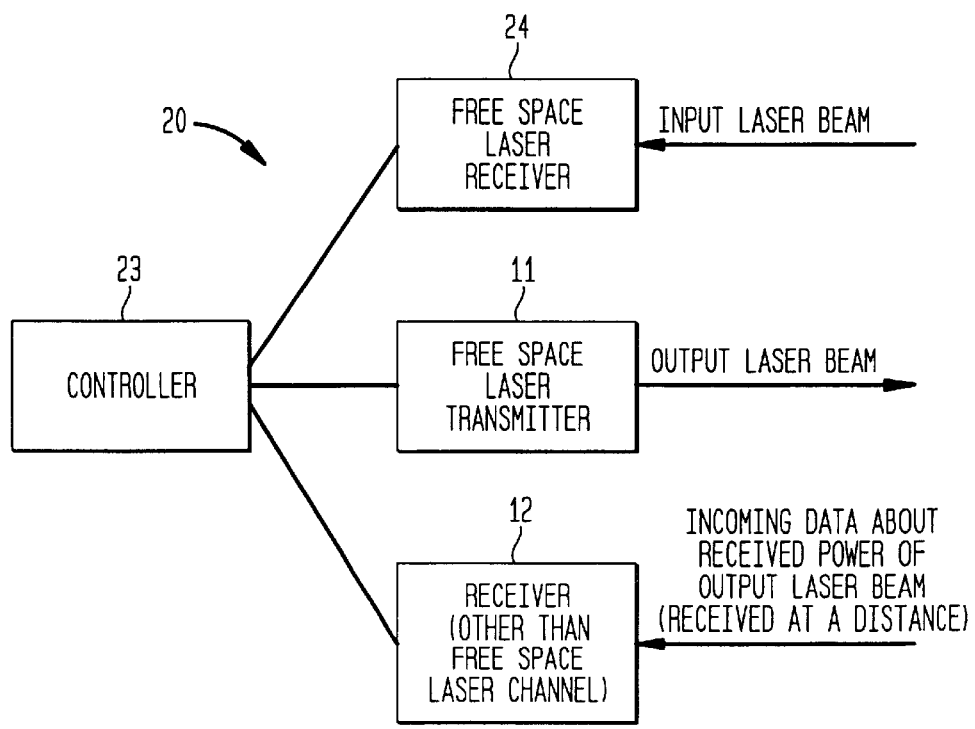
FIG. 2 is a general block diagram illustrating another exemplary embodiment of a communication terminal according to the present invention.

FIG. 2 is a general block diagram illustrating a communication terminal 20 according to another preferred embodiment of the present invention. As shown, the communication terminal 20 includes a transmitter 11, a first receiver 12, a second receiver 24, and a controller 23. The transmitter 11, the first receiver 12, and the second receiver 24 are operatively connected to the controller 23. The transmitter 11 and the first receiver 12 are as in the embodiment described with respect to FIG. 1 and will not be further described with respect to FIG. 2.

The second receiver 24 receives input laser beam(s) from free space laser beam(s) transmitted by other communication terminals forming the communication link or network. The second receiver 24 includes detector(s) sensitive to the wavelengths of the input laser beam(s). In one implementation, the second receiver 24 includes optics used to collimate or direct, or both, the input laser beam(s) onto the detector(s)—the optics used may be refractive (e.g., lenses) or reflective (e.g., mirrors), or a combination. Furthermore, in one implementation, the second receiver 24 includes elements that separate, obtain, or deconvolve the communicated data from the input laser beam. In an alternative implementation, the second receiver 24 includes means for transferring the signal generated (because of the detected input laser beam) to signal processors, which then obtain the data impressed on the input laser beam. Moreover, in one implementation, the second receiver 24 includes detectors that measure the power of the received input laser beam.

The controller 23 has all of the features of controller 13 and in addition, in an implementation in which second receiver does not obtain the power of the input laser beam, processes and obtains the power of the input laser beam. Furthermore, in an implementation in which the second receiver does not obtain the communicated data impressed on the received input laser beam, the controller processes and obtains the communicated data impressed on the received input laser beam. The controller 23 uses information received from the first receiver 12 or the second receiver 24, or both, to determine whether a drop in the power received at a target terminal is due to atmospheric effects or due to blockage. The determination will be discussed in detail below in the section titled "Tests Distinguishing Between Atmospheric Effects and Blockage."

The preferred embodiment described above with respect to FIG. 2 allows for one-way (link arrangement) and two-way (network arrangement) communication between the communication terminal 20 and other communication terminals at some distance from the terminal 20.

Figure 3:
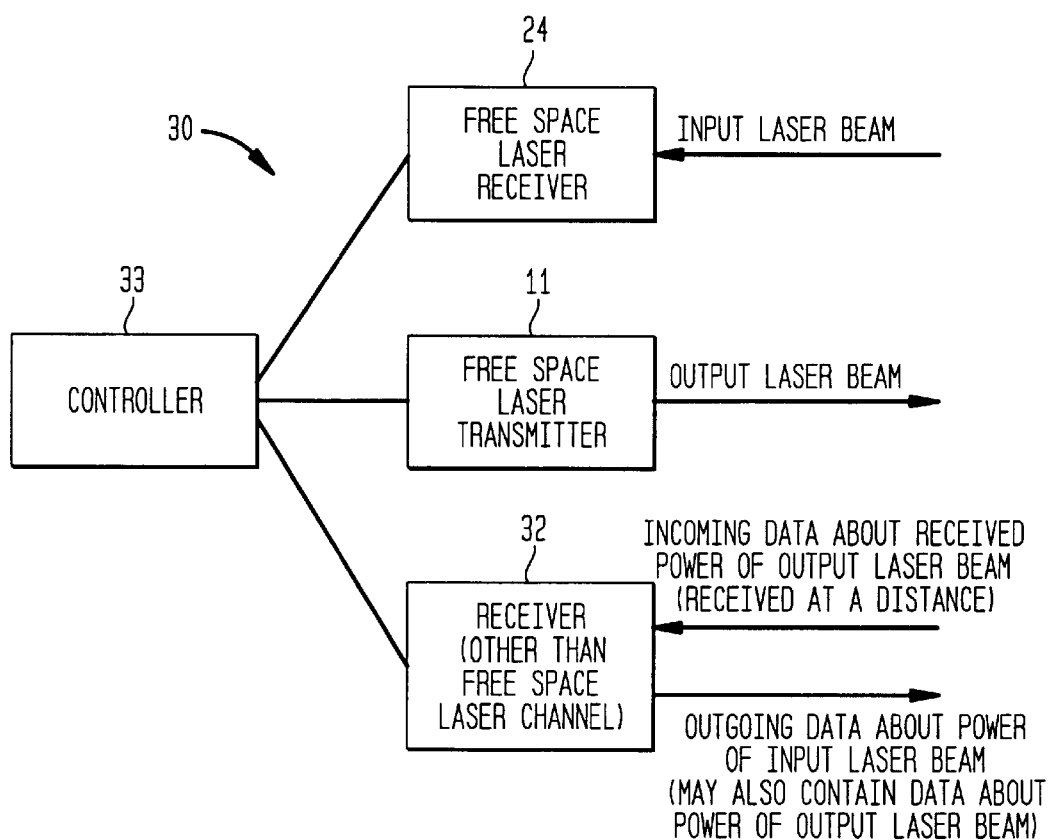
FIG. 3 is a general block diagram illustrating a further exemplary embodiment of a communication terminal according to the present invention.

FIG. 3 is a general block diagram illustrating a communication terminal 30 according to a further preferred embodiment of the present invention. As shown, the communication terminal 30 includes a transmitter 11, a transceiver 32, a receiver 24, and a controller 33. The transmitter 11, the transceiver 32, and the receiver 24 are operatively connected to the controller 33. The transmitter 11 and the receiver 24 are as in the embodiments described with respect to FIGS. 1 and 2, respectively, and will not be further described with respect to FIG. 3.

The transceiver 32 has the features of receiver 12 but in addition has a transmitter allowing the transmission of information about the power of the input laser beam that the terminal 30 receives (at the receiver 24). Transceiver 32 obtains the information about the power of the input laser beam either from the receiver 24 or from the controller 33.

The controller 33 has the features of controller 23 but in addition calculates the information about the power of the input laser beam and relays it to transceiver 32. In an alternative implementation, controller 33 just relays the information obtained from the receiver 24 to transceiver 32. The controller 33 uses information received from the receiver 32 or the receiver 24, or both, to determine whether a drop in the power received at a target terminal is due to atmospheric effects or due to blockage. The determination will be discussed in detail below in the section titled "Tests Distinguishing Between Atmospheric Effects and Blockage."

The preferred embodiment described above with respect to FIG. 3 allows for one-way (link arrangement) and two-way (network arrangement) communication between the communication terminal 30 and other communication terminals at some distance from the terminal 30

In view of the inventive principles disclosed herein, the arrangement of the transmitter 11 and the receiver 24 of the embodiments according to FIGS. 2 and 3 may be implemented as having the transmitter be composed of a plurality of transmitters surrounding the receiver. For example, an implementation has four transmitters with apertures having 3-cm diameter are centered at the corners of 16-cm sided square, and has the receiver with an aperture having a 20-cm diameter centered at the center of the square. On the other hand, the reverse may be used to have a plurality of receivers 24 surround a single transmitter 11. In another implementation, concentric apertured transmitter 11 and receiver could be used: Either the transmitter 11 surrounding the receiver 24 or vice versa. It is also to be noted that auto alignment techniques may be used to remove the concern of reduction in the power of the received free space laser beam due to misalignments not including a blockage.

Tests Distinguishing Between Atmospheric Effects and Blockage

For the embodiments described above, the controllers (13, 23, 33) use a decision-making procedure that determines whether one or more of the following conditions occur:

1. Low-signal Test

This test applies to embodiments described with respect to FIGS. 1, 2, and 3. A controller 13, 23, 33 determines whether the power of an output laser beam transmitted by the transmitter 11 of the terminal 10, 20, 30 that is received at some distant communication terminal is too low. Note that the terminal 10, 20, 30 receives at the receiver 12, 32 information about the power of the laser beam received at the distant communication terminal. The controller 13, 23, 33 determines that blockage is the cause of a change in the received power if the received power is too low. The rationale being that the transmitter 11 of the output laser beam transmitting terminal 10, 20, 30 is blocked, or the receiver 24 of a distant receiving communication terminal is blocked, or both are blocked.

For example, with a system having an operation frequency of 60 Hz, the test may be performed on 0.8 seconds of data every 0.2 seconds. In this case, a running average of 48 data points is obtained and blockage is determined if this average is below some predetermined value (e.g., 1 dBm).

The number of data points being averaged, the predetermined value, and the repetition rate of the test depend on the application at hand.

Some atmospheric effects can induce a test result appearing as blockage. For example, attenuation of the transmitted laser beam due to fog may result in a test result indicating that blockage has occurred. Other atmospheric effects, e.g., atmospheric scintillation, will not result in attenuation and therefore will not yield a test result appearing as blockage. An atmospheric effect falsely indicating blockage is a false positive test result. A false positive of blockage indication, however, does not increase the risk of accidental exposure—the objective of the test, after all, is avoiding accidental exposures.

2. Sudden-drop Test

This test applies to embodiments described with respect to FIGS. 1, 2, and 3. A controller 13, 23, 33 determines whether the power of an output laser beam transmitted by the transmitter 11, 21, 31 of the terminal 10, 20, 30 that is received at some distant communication terminal suddenly drops by more than a predetermined amount. Note that the terminal 10, 20, 30 receives at the receiver 12, 32 information about the power of the laser beam received at the distant communication terminal. The controller 13, 23, 33 determines that blockage is the cause of a change in the received power if the change in the received power is sudden. The rationale being that the transmitter 11 of the output laser beam transmitting terminal 10, 20, 30 is blocked, or the receiver 24 of a distant receiving communication terminal is blocked, or both are blocked.

For example, with a system having an operation frequency of 60 Hz, the test may be performed every 0.2 seconds by calculating a short term running average on 0.8 seconds of data and comparing it with calculation of a reference average (e.g., a longer term running average of 10 seconds). In this case, a short term running average of 48 data points is obtained and compared with a longer term running average of 600 data points and blockage is determined if the difference between the short term average and the long term average is greater than a predetermined value (e.g., 1 dB). The averaging may be performed taking into account the power of the output laser beam at the transmitter 11 corresponding to the specific data points.

The number of data points being averaged, the predetermined value, and the repetition rate of the test depend on the application at hand.

The reference average for this test is chosen to be as long as possible (e.g., 10 seconds) but short enough so that attenuation caused by fluctuations in atmospheric attenuation (e.g. due to fog) does not cause false alarms.

The sudden-drop test should generally not be used immediately after (in the first 10 seconds for the above example) emerging from a determination by the controller 13, 23, 33 using the low-signal test that blockage occurred, since the reference average (i.e., the long term running average) needs to be recalculated. However, if accuracy is not critical, then the long term average just before a determination that blockage occurred may be used.

3. Two-end Imbalance Test

This test applies to embodiments described with respect to FIGS. 2 and 3. A controller 23, 33 determines whether the difference between the signals received by the receiver 12, 32 and the receiver 24 is more than a predetermined amount. Note that the communication terminal 20, 30 receives at the receiver 12, 32 information about the power of the laser beam received at the distant communication terminal, and receives at the receiver 24 the input laser beam. The imbalance in power determination indicates that the transmitter 11 is blocked, or the receiver 24 is blocked, or those corresponding ones of the distant communication terminal are blocked. In the presence of an imbalance, the controller 23, 33 determines that a blockage is the cause of a change in the power received.

The calculations are similar to the sudden-drop test. For example, with a system having an operation frequency of 60 Hz, the two-end imbalance test may be performed every 0.2 seconds by calculating a short term running average on 0.8 seconds of data, calculating a reference average (e.g., a longer term running average of 10 seconds), and obtaining the difference between the short and long term averages—these calculations being performed for data obtained at the receiver 12, 32. In this case, a short term running average of 48 data points is obtained, a longer term running average of 600 data points is obtained (corresponding to averaging over 10 seconds), and the difference between them is obtained. Similar calculations are performed for data obtained at the receiver 24. Blockage is determined if the difference between the differences is greater than a predetermined value (e.g., 1 dB). The averaging may be performed taking into account the power of the output laser beam corresponding to the specific data points.

The number of data points being averaged, the predetermined value, and the repetition rate of the test depend on the application at hand.

An advantage of the two-end imbalance test is that the difference is unaffected by atmospheric effects, which have the same effect on both directions of transmission. Consequently, the two-way imbalance test could be used immediately (during the first 10 seconds in the example above) without sacrifice in accuracy after emerging from a determination by the controller 23, 33 that blockage occurred, since the difference of differences is insensitive to atmospheric effects.

Table I presents the use of the tests described above as primary and secondary indicators of various blockage situations. In this table, P denotes a primary algorithm and S denotes a secondary algorithm for detecting blockage.

| Intrusion | Low-signal test | Two-end imbalance test | Sudden-drop test |
| --- | --- | --- | --- |
| Partial blockage of the transmitting and/or receiving apertures | S | P | P |
| Complete blockage of all transmitting apertures | P | S | S |
| Partial blockage of the transmitting and/or receiving apertures in the first 10 seconds after emerging from a | S | P | Not available during the first 10 seconds after emerging from |

| Intrusion | Low-signal test | Two-end imbalance test | Sudden-drop test |
|---|---|---|---|
| determination of blockage. | | | a determination of blockage. |

As mentioned above, the tests may be individually used. They may also be used in combination to improve accuracy and lower risk. An approach combining the tests is as follows. After a determination that blockage has occurred, the controller 13, 23, 33 causes the reduction of power of the output laser to regulatorily established safe levels (including but not limited to turning off the laser power), and that it be kept at those levels for a regulatorily established duration (e.g., 100 seconds). After this duration of lower power output laser beams, the power is raised to the value just prior to the determination of blockage. The power raising is accompanied by using the low-signal and two-end imbalance tests for the duration of obtaining the long term running average (e.g., 10 seconds), and then using the sudden-drop test after accumulating the long term running average in addition to the other two tests.

Generally, the tests occur at a frequency rapid enough to detect blockage within 1 second of its occurrence—this time element may be changed depending on regulations.

In one implementation, the controller 13, 23, 33 of terminal 10, 20, 30 causes the reduction of power of the output laser beam to regulatorily established safe levels (including but not limited to turning off the laser power) for as long as the receiver 12, 32 does not receive necessary signals. Furthermore, in another implementation, the controller 13, 23, 33 in this situation causes the generation of alarm signals.

In another implementation. The controller 33 of terminal 30 causes the generation (either itself or by transceiver 32) and transmission (by transceiver 32) of a signal indicating that terminal 30 has determined that blockage occurred-this signal will part of the data packet being transmitted by transceiver 32 and received by the receiver 12, 32. A target communication terminal that is the other part of a link or network communication with the terminal 30, upon receiving this signal will itself lower the power of its output laser beam.

Although the present invention has been described in considerable detail with reference to certain embodiments, it should be apparent that various modifications and applications of the present invention may be realized without departing from the scope and spirit of the invention.

Scope of the invention is meant to be limited only by the claims presented herein.

We claim:

1. A method for controlling the power level of a laser signal in free space communication, said method comprising:

transmitting, by a communication terminal, an output laser beam into free space;

receiving, by said communication terminal, at least one signal through a channel that is not free space laser based, said at least one signal representing the power of said output laser beam measured at a distance and at different times;

determining, by said communication terminal, whether a drop in the power of said output laser beam measured at said distance is due to atmospheric effects based on said at least one measurement;

increasing the power level of said output laser beam to a desired level if the power drop is determined to be due to atmospheric effects; and lowering the power of said output laser beam to a predetermined level if the power drop is determined not to be due to atmospheric effects.

2. The method of claim 1, wherein said determining step includes obtaining a first parameter corresponding to a short term running average of said at least one signal and using said first parameter to determine whether the power drop is due to atmospheric effects.

3. The method of claim 2, wherein said determining step includes comparing said first parameter with a first threshold value to determine whether the power drop is due to atmospheric effects.

4. The method of claim 3, wherein said determining step includes obtaining a second parameter corresponding to a long term running average of said at least one signal and using said second parameter to determine whether the power drop is due to atmospheric effects.

5. The method of claim 4, wherein said determining step includes comparing a difference between said first and second parameters with a second threshold value to determine whether the power drop is due to atmospheric effects.

6. The method of claim 5, further comprising receiving, by said communication terminal, an input laser beam from free space; and wherein said determining step includes obtaining a third parameter corresponding to a short term running average of the power of said received input laser beam and using said third parameter to determine whether the power drop is due to atmospheric effects.

7. The method of claim 6, wherein said determining step includes comparing a value based on a difference between said first and third parameters with a third threshold value to determine whether the power drop is due to atmospheric effects.

8. The method of claim 6, further comprising transmitting, by said terminal, at least one second signal through said channel that is not free space laser based, said at least one second signal representing the power of said input laser beam measured at different times.

9. The method of claim 1, further comprising determining, by said communication terminal, whether a drop in the power of said output laser beam measured at said distance is due to blockage based on said at least one signal;

lowering the power of said output laser beam to a predetermined level if the power drop is determined to be due to blockage.

10. The method of claim 1, further comprising lowering the power of said output laser beam to a second predetermined level if said terminal does not receive said at least one signal.

11. The method of claim 1, wherein said distance is the distance to another communication terminal.

12. A method for controlling the power level of a laser signal in free space communication, said method comprising:

transmitting, by a communication terminal, an output laser beam into free space;

receiving, by said communication terminal, at least one signal through a channel that is not free space laser based, said at least one signal representing the power of said output laser beam measured at a distance and at different times;

determining, by said communication terminal, whether a drop in the power of said output laser beam measured at said distance is due to blockage based on said at least one signal;

increasing the power level of said output laser beam to a desired level if the power drop is determined not to be due to blockage; and lowering the power of said output laser beam to a predetermined level if the power drop is determined to be due blockage.

13. A terminal controlling the power level of a laser signal in free space communication, said terminal comprising:

a transmitter arranged to transmit an output laser beam into free space;

a receiver arranged to receive at least one signal through a channel that is not free space laser based, said at least one signal representing the power of said output beam measured at a distance and at different times; and a controller operatively connected to said transmitter and receiver, said controller determining whether a drop in the power of said output laser beam measured at said distance is due to atmospheric effects based on said at least one signal, said controller increasing the power level of said output laser beam to a desired level if the power drop is determined to be due to atmospheric effects, and said controller lowering the power of said output laser beam to a predetermined level if the power drop is determined not to be due to atmospheric effects.

14. The terminal of claim 13, wherein said controller obtains a first parameter corresponding to a short term running average of said at least one signal and uses said first parameter to determine whether the power drop is due to atmospheric effects.

15. The terminal of claim 14, wherein said controller compares said first parameter with a first threshold value to determine whether the power drop is due to atmospheric effects.

16. The terminal of claim 15, wherein said controller obtains a second parameter corresponding to a long term running average of said at least one signal and uses said second parameter to determine whether the power drop is due to atmospheric effects.

17. The terminal of claim 16, wherein said controller compares a difference between said first and second parameters with a second threshold value to determine whether the power drop is due to atmospheric effects.

18. The terminal of claim 17, further comprising a second receiver arranged to receive an input laser beam from free space; wherein said controller is also operatively connected to said second receiver; and wherein said controller obtains a third parameter corresponding to a short term running average of the power of said received input laser beam and uses said third parameter to determine whether the power drop is due to atmospheric effects.

19. The terminal of claim 18, wherein said controller compares a value based on a difference between said first and third parameters with a third threshold value to determine whether the power drop is due to atmospheric effects.

20. The terminal of claim 18, wherein said receiver receiving said at least one signal is a transceiver also arranged to transmit at least one second signal through said channel that is not free space laser based, said at least one second signal representing the power of said input laser beam measured at different times.

21. The terminal of claim 13, wherein said controller determines whether a drop in the power of said output laser beam measured at said distance is due to blockage, and wherein said controller lowers the power of said output laser beam to a predetermined level if the power drop is determined to be due to blockage.

22. The terminal of claim 13, wherein said controller lowers the power of said output laser beam to a second predetermined level if said receiver does not receive said at least one second signal.

23. The terminal of claim 13, wherein said distance is the distance to another communication terminal.

24. A terminal controlling the power level of a laser signal in free space communication, said terminal comprising:

a transmitter arranged to transmit an output laser beam into free space;

a receiver arranged to receive at least one signal through a channel that is not free space laser based, said at least one signal representing the power of said output beam measured at a distance and at different times; and a controller operatively connected to said transmitter and receiver, said controller determining whether a drop in the power of said output laser beam measured at said distance is due to blockage based on said at least one signal, said controller increasing the power level of said output laser beam to a desired level if the power drop is determined not to be due to blockage, and said controller lowering the power of said output laser beam to a predetermined level if the power drop is determined to be due to blockage.

\* \* \* \* \*